Patented Mar. 1, 1938

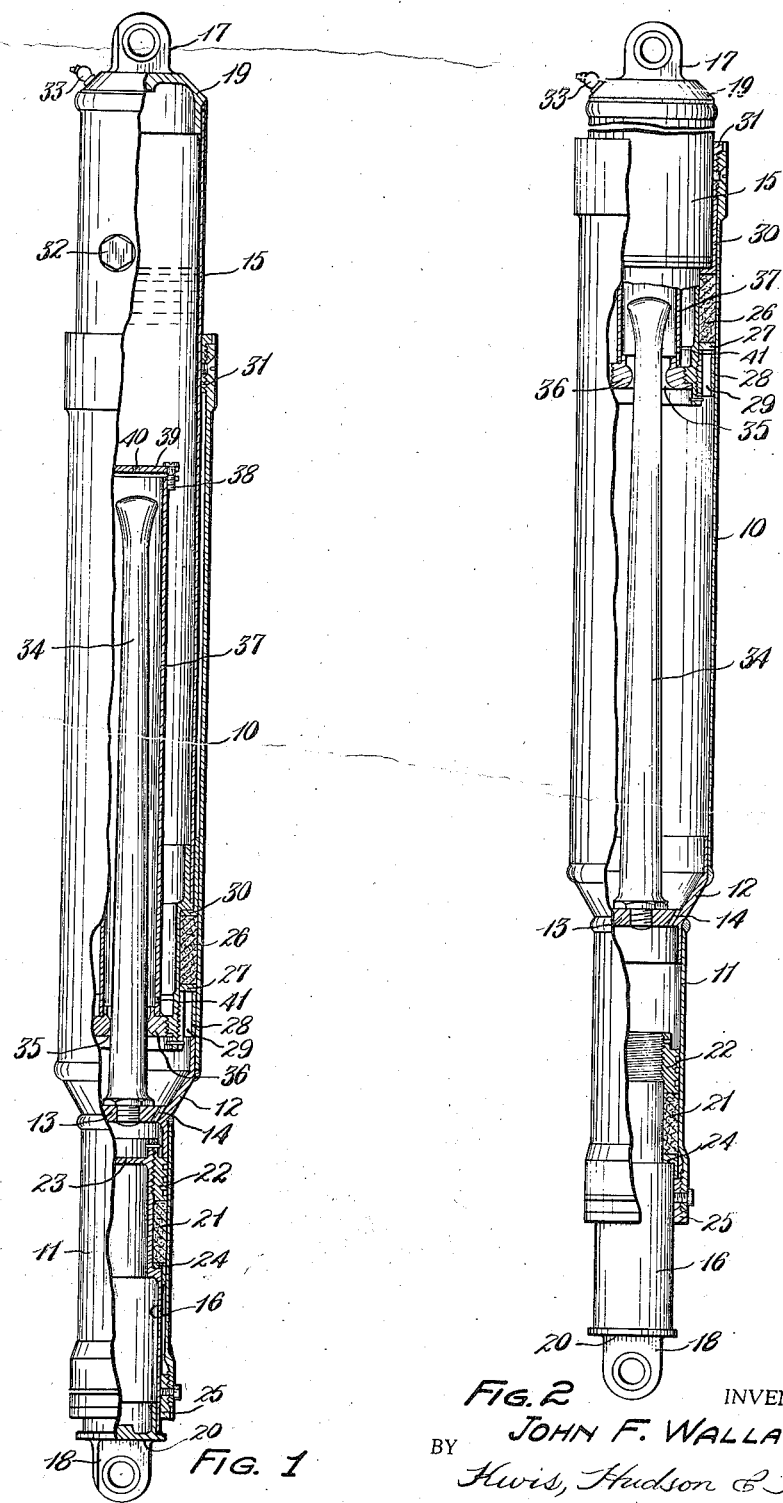

2,109,891

UNITED STATES PATENT OFFICE 2,109,891

SHOCK ABSORBER

John F. Wallace, Cleveland, Ohio, assignor to The Cleveland Pneumatic Tool Company, Cleveland, Ohio, a corporation of Ohio Application December 18, 1936, Serial No. 116,597

11 Claims. (Cl. 267—64)

This invention relates to improvements in shock absorbers, particularly shock absorbers for aircraft, and it has to do primarily with shock absorbers in which there is a compound action upon the landing of the airplane, that is to say a preliminary liquid metering action and a subsequent compression of a pneumatic chamber, the latter with or without a further liquid metering action.

One of the objects of the invention is the provision in a shock absorber of this character of means for transferring to the pneumatic chamber liquid which is displaced by the contraction of the hydraulic chamber, thereby permitting the use of a relatively small hydraulic unit.

Another object is the provision in such a shock absorber of means in the pneumatic unit for metering liquid in connection with compression of the air.

Still another object is the provision in a shock absorber of the kind specified of means for checking rebound in the pneumatic unit.

Other objects and features of novelty will appear as I proceed with the description of that embodiment of the invention which, for the purposes of the present application, I have illustrated in the accompanying drawing, in which Fig. 1 is an elevational view, partly broken away and partly in vertical section, of a shock absorber embodying the invention, the telescoping members being shown in the positions which they occupy when the shock absorber is fully compressed or contracted; and Fig. 2 is a similar view with the parts in their fully extended positions.

In the drawing I have illustrated a shock absorber of the hydro-pneumatic type, but in which there is, in addition to the hydro-pneumatic unit, a second unit that is purely hydraulic. In the preferred construction herein illustrated, I employ a cylindrical casing having an upper large diameter part 10 and a lower small diameter part 11. These parts are formed preferably of metal tubing, and they are connected together by a forged or cast member 12 having integral therewith a rigid partition 13 provided with one or more small openings 14 constituting a liquid metering passage or passages.

Within the cylindrical parts 10 and 11 of the casing I mount telescoping cylinders 15 and 16 respectively. At their outer ends these cylinders carry brackets 17 and 18 which are formed and arranged for attachment to the parts whose relative movements are to be cushioned. In an airplane the bracket 17 would be connected with the fuselage or wing structure of the airplane, and the bracket 18 would be connected with the running gear. In the case of the upper cylinder 15 this attaching bracket may be made integral with a head 19 which closes and seals the outer end of the cylinder. In the drawing I have also shown a head 20 integral with bracket 18 at the outer end of cylinder 16. This head is desirable as a reinforcement for the cylinder, but is not required as a closure.

The upper portion of the cylinder 16 is preferably constricted somewhat to provide a seat for an annular packing 21 and a packing gland nut 22, which in the uppermost position of the cylinder engages a depending annular flange on the member 12 to stop further upward movement. Near its upper end this cylinder has a piston head 23. At the lower end of packing 21 there is a metal ring 24. This ring is adapted to engage a sleeve 25 secured to the lower end of casing part 11, whereby the outward telescoping movement of these parts is stopped or limited, as indicated in Fig. 2.

The upper cylinder 15 has a constricted lower end which accommodates an annular packing 26. A metal ring 27 is interposed between the packing and a gland nut 28. The ring 27 may have one or more passages 29 therethrough, the function of which is to expose the ring 27 to the pressure exerted through the oil or other liquid in the shock absorber when the piston head 23 rises. This pressure is communicated to packing 26 and tends to compress the same longitudinally, causing it to expand radially and thereby increasing the friction of the packing against the wall of the casing, which has a damping effect upon the expanding movement of this unit. Above the packing 26 there is a metallic ring 30 angular in cross-section. This ring is adapted to engage a metal sleeve 31 secured internally to the outer end of casing part 10, and the engagement of these rings stops the outward telescoping movement of the parts 10 and 15.

32 is a plug which closes a liquid intake opening. It is properly positioned lengthwise of the cylinder 15 to regulate the quantity of oil or other liquid which may be introduced into the shock absorber when the parts are in a given relative position, as, for instance, when they are supporting the weight of the airplane. An air valve 33 is also provided to facilitate the inflation of the upper chamber. Fig. 1 shows the condition of the strut before inflation. After inflation the shock absorber will of course be expanded so that the cylinder 15 will extend out of the casing 10 further than in Fig. 1.

In some cases I desire to combine with the pneumatic action of the upper chamber a liquid metering action which shall be in addition to the metering of liquid through port 14, and also to provide means for checking rebound after the air chamber has been compressed. In such cases I mount a metering pin 34 in the partition 13. This pin projects upwardly through a port 35 in a piston head 36 at the lower extremity of the cylinder 15. The piston head 36 has an upwardly extending flange around port 35 by means of which a check-tube 37 is centered. This tube surrounds the pin 34 and is attached to the piston head 36, preferably by a weld. It is long enough to accommodate the pin in all relative positions of the cylinder 15 and casing 10. The upper end of the tube is flanged outwardly to receive a plurality of screws 38 which project through smooth holes in a valve plate 39. The shanks of these screws below their heads are long enough to permit some movement of the plate 39 up and down. One or more small ports 40 through the plate permit a metered flow of liquid in either direction, while the annular opening beneath the plate, when the latter is raised as in Fig. 1, permits a comparatively free flow of liquid out of the tube 37. In addition to the small port 40 in plate 39, I may provide a further small port 41 in the wall of the tube 37 providing constant communication between the interior of the tube and the main space within cylinder 15 above piston head 36.

*Operation.*—When an airplane equipped with shock absorbers built in accordance with the present invention is in the air the casing 10, 11 and the two cylinders 15 and 16 will take the positions illustrated in Fig. 2 of the drawing. The compressed air in the upper chamber of the shock absorber, assisted by gravity, expands that chamber. The lower chamber, between partition 13 and piston head 23, is also expanded at such times to the condition illustrated in Fig. 2, the expansion of the latter chamber being due to the pull of gravity upon the cylinder 16 and the running gear suspended thereby.

When the running gear touches the ground during the landing of the airplane the first action is to raise the cylinder 16, that is with relation to the balance of the shock absorber. This action must progress rather slowly, however, because in rising the piston head 23 must displace the liquid above it through the constricted passage 14. This movement of cylinder 16 will ordinarily be completed before there is any appreciable movement of piston 36 because the load on piston 23 is less than that upon piston 36 on account of its smaller diameter.

When the gland nut 22 engages the flange depending from partition 13, the lower cylinder 16 and the casing 10, 11 must necessarily move together so far as upward thrust from the running gear is concerned. Thereafter the effect of the compression stroke is to telescope together the casing member 10 and the cylinder 15. In order that this may occur, liquid must flow upwardly through the annular port 35 surrounding the metering pin 34 into the tube 37 and out of the tube 37 through ports 40 and 41 and the annular space beneath valve plate 39. This raises the liquid level in cylinder 15 and compresses the air in the upper part of that cylinder. The parts are so designed that the flow of liquid out of the tube 37 on the compression stroke is free as compared with the flow of liquid into the tube through the annular port 35. The landing shock is absorbed over a considerable space of time, not only because of the necessity for the liquid to pass through the small port 41 but also because of the necessity for it to be metered through the passage 35 after the completion of the movement of piston head 23. The compression of the air in cylinder 15 takes place simultaneously with the metering of liquid through passage 35. When the landing operation has proceeded far enough so that the weight of the airplane is borne upon the shock absorbers, the piston head 36 will take a position somewhere between those illustrated in Figs. 1 and 2 and the shocks of taxiing will be taken largely by the cushion of air.

Rebound shocks are checked because any tendency to expand the chamber above partition 13 will immediately cause the valve plate 39 to seat itself upon the top of tube 37, and the flow of liquid into the tube thereafter must be through the small ports 40 and 41 only. In this manner the expansion of the chamber is slowed down, in other words the rebound stroke is checked.

While in the foregoing description of the embodiment of the invention selected for illustration I have necessarily gone somewhat into detail, I desire it to be understood that such detail disclosure is not to be interpreted as limiting the invention except in so far as such details may be included in the appended claims. The expressions "cylinder" and "cylindrical" as herein used are not intended to have a limited construction, but should be understood to include not only tubular bodies of circular cross-section but also tubular bodies of cross-sections other than circular.

Having thus described my invention, I claim:

1. In a shock absorber, a cylindrical casing, a rigid partition in said casing at a point intermediate its ends dividing the shock absorber into two chambers, end cylinders telescoping with said casing on opposite sides of said partition, means on the outer ends of said cylinders for attachment to the parts whose relative movements are to be cushioned, a liquid metering port through said partition, one of said cylinders having a piston extending thereacross engaging the wall of the casing and constituting the outer wall for the chamber on that side of the partion, the other cylinder having a closure constituting the outer wall of the other chamber, and means for admitting air under pressure to the latter chamber.

2. In a shock absorber, a cylindrical casing, a rigid partition in said casing at a point intermediate its ends dividing the shock absorber into two chambers, end cylinders telescoping with said casing on opposite sides of said partition, means on the outer ends of said cylinders for attachment to the parts whose relative movements are to be cushioned, a liquid metering port through said partition, each of said cylinders having a piston bearing upon the wall of the casing, one of said pistons having a liquid metering port therethrough, a closure for the outer end of the cylinder carrying said ported piston, and means for admitting air under pressure to the chamber in which the ported piston is located.

3. In a shock absorber, a cylindrical casing, a rigid partition in said casing at a point intermediate its ends dividing the shock absorber into upper and lower chambers, upper and lower cylinders telescoping with said casing on opposite sides of said partition, means on the outer ends of said cylinders for attachment to the parts whose relative movements are to be cushioned, a liquid metering port through said partition, said lower cylinder having a piston extending thereacross engaging the wall of the casing, the upper cylinder being closed at its outer end, and means for admitting air under pressure to the upper cylinder.

4. In a shock absorber, a cylindrical casing, a rigid partition in said casing at a point intermediate its ends, upper and lower cylinders telescoping with the said casing on opposite sides of said partition, means on the outer ends of said cylinders for attachment to the parts whose relative movements are to be cushioned, a liquid metering port through said partition, each of said cylinders having a piston bearing upon the wall of the casing, the upper piston having a liquid metering port therethrough, and means for admitting air under pressure to the upper cylinder above its piston.

5. In a shock absorber for airplanes, a cylindrical casing, a rigid partition in said casing at a point intermediate its ends dividing the shock absorber into a hydraulic chamber and a hydropneumatic chamber, end cylinders telescoping with said casing on opposite sides of said partition, means on the outer ends of said cylinders for attachment to the parts whose relative movements are to be cushioned, said partition having a liquid metering port therethrough, the fluid column in said hydraulic chamber being of less cross-sectional area than that in said hydropneumatic chamber, whereby the first action of the shock absorber upon the landing of the airplane is to meter liquid through the partition port from the hydraulic chamber into the hydropneumatic chamber.

6. In a shock absorber for airplanes, a cylindrical casing having a large diameter portion constituting a hydro-pneumatic chamber and a small diameter portion constituting a hydraulic chamber, a partition across the casing at the junction of said large and small diameter portions, large and small diameter cylinders slidable within said large and small diameter casing portions, means on the outer ends of the cylinders for attachment to the parts whose relative movements are to be cushioned, said partition having a liquid metering port therethrough, each of said cylinders having a piston bearing upon the wall of the casing, whereby the first action of the shock absorber upon the landing of the airplane is to meter liquid through the partition port from the hydraulic chamber into the hydropneumatic chamber.

7. In a shock absorber for airplanes, a cylindrical casing having a large diameter portion and a small diameter portion, a partition across the casing at the junction of said large and small diameter portions, large and small diameter cylinders slidable within said large and small diameter casing portions, means on the outer ends of the cylinders for attachment to the parts whose relative movements are to be cushioned, said partition having a liquid metering port therethrough, each of said cylinders having a piston bearing upon the wall of the casing, the piston for said larger cylinder having a liquid metering port therethrough, a closure for the outer end of the larger cylinder, and means for admitting air under pressure to the larger cylinder.

8. In a shock absorber, a cylindrical casing, a rigid partition in said casing at a point intermediate its ends, end cylinders telescoping with said casing on opposite sides of said partition, means on the outer ends of said cylinders for attachment to the parts whose relative movements are to be cushioned, a liquid metering port through said partition, said lower cylinder having a piston extending thereacross engaging the wall of the casing, the upper cylinder being closed at its outer end, and means above the said partition for checking rebound hydraulically.

9. In a shock absorber, a cylindrical casing, a rigid partition in said casing at a point intermediate the ends, upper and lower cylinders telescoping with said casing on opposite sides of said partition, means on the outer ends of said cylinders for attachment to the parts whose relative movements are to be cushioned, a liquid metering port through said partition, said lower cylinder having a piston extending thereacross engaging the wall of the casing, the upper cylinder being closed at its upper end, and means comprising a metering pin and a cooperating apertured diaphragm above the said partition for metering liquid during the compression stroke of the shock absorber.

10. In a shock absorber, a cylindrical casing, a rigid partition in said casing at a point intermediate its ends, said partition having a metering opening therethrough, two pistons reciprocable in said casing, one on either side of said partition, a metering pin mounted in and extending upwardly from said partition, the upper piston having an aperture surrounding and cooperating with said metering pin, a tubular piston rod for said upper piston surrounding said metering pin and closed at its upper end, and closable means for admitting air under pressure to said tubular piston.

11. In a shock absorber, a cylindrical casing, a rigid partition in said casing at a point intermediate its ends, said partition having a metering opening therethrough, two pistons reciprocable in said casing, one on either side of said partition, a metering pin mounted in and extending upwardly from said partition, the upper piston having an aperture surrounding and cooperating with said metering pin, a tube mounted on said piston surrounding said metering pin, said tube having a one-way valve therein arranged to open on the impact stroke and close on the rebound stroke, said upper piston having a tubular piston rod surrounding said first named tube and closed at its upper end, and closable means for admitting air under pressure to said tubular piston.

JOHN F. WALLACE.